United States Patent [19]

Sasaki

[11] Patent Number: 4,636,844
[45] Date of Patent: Jan. 13, 1987

[54] METHOD OF PROCESSING A COLOR IMAGE SIGNAL

[75] Inventor: Takashi Sasaki, Tokyo, Japan

[73] Assignee: Canon Kabushiki Kaisha, Tokyo, Japan

[21] Appl. No.: 704,932

[22] Filed: Feb. 25, 1985

[30] Foreign Application Priority Data

Feb. 29, 1984 [JP] Japan .................................. 59-38340

[51] Int. Cl.⁴ ............................................ H04N 1/387
[52] U.S. Cl. ........................................ 358/80; 358/75
[58] Field of Search .............................. 358/75, 79, 80

[56] References Cited

U.S. PATENT DOCUMENTS 3,555,262  1/1971  Shimada ................................ 358/79
4,060,829 11/1977  Sakamoto ............................. 358/80
4,346,402  8/1982  Pugsley ................................. 358/80

Primary Examiner—James J. Groody
Assistant Examiner—Robert M. Bauer
Attorney, Agent, or Firm—Fitzpatrick, Cella, Harper & Scinto

[57] ABSTRACT

A method of processing a color image signal comprising the step of performing a color adjustment by inputting the number of bits for each color in accordance with the concentrations of inhomogeneous color components contained in colorants: cyan, magenta and yellow.

8 Claims, 4 Drawing Figures

METHOD OF PROCESSING A COLOR IMAGE SIGNAL

BACKGROUND OF THE INVENTION

1. Field of the Invention

The present invention relates to a method of processing a color image signal to form a color image using colorants of cyan, magenta and yellow.

2. Description of the Prior Art

Conventionally, in a method of this type, a masking process has been performed to remove inhomogeneous color components contained in colorants: cyan, magenta and yellow, thereby improving color reproduction. For example, masking is performed on the basis of the following matrix operation:

$$\begin{pmatrix} C' \\ M' \\ Y' \end{pmatrix} = \begin{pmatrix} C_c & C_m & C_y \\ M_c & M_m & M_y \\ Y_c & Y_m & Y_y \end{pmatrix} \begin{pmatrix} C \\ M \\ Y \end{pmatrix}$$

where C, M and Y are the input concentrations of colorants: cyan, magenta and yellow, C', M' and Y' are the output concentrations of the colorants, and $C_c$, $C_m$, $C_y$; $M_c$, $M_m$, $M_y$; $Y_c$, $Y_m$, $Y_y$ are matrix factors.

Recent progress in digital processing techniques have brought a masking process which is performed in the form of a table conversion generally using ROMs 11, 12 and 13 in FIG. 1. However, execution having this method requires a memory of a large capacity, up to $2^{18} \times 6$ bits = $3/2 \times 2^{20}$ = 1.5 megabits if C, M, Y inputs are each 6 bits and C', M', Y' outputs are each 6 bits as well, thereby raising the cost of the device.

SUMMARY OF THE INVENTION

It is therefore an object of the present invention to eliminate the above drawbacks.

In more detail, it is a specific object of the present invention to provide a method of processing a color image signal which performs efficient masking in view of the spectral characteristics of each of colorrants cyan, magenta and yellow.

It is another object of the present invention to provide a method of processing a color image signal which can reduce the capacity of a ROM for tables when masking is performed by looking up the tables.

It is still another object of the present invention to provide a method of efficiently producing a black signal on the basis of a plurality of input color signals.

The above and other objects, features and advantages of the present invention will be apparent from the following description of a preferred embodiment thereof, taken in conjunction with the accompanying drawings.

DETAILED DESCRIPTION OF THE PREFERRED EMBODIMENTS

TABLE 1 shows the concentration ratios of the inhomogeneous color components contained in each commercially available cyan, magenta and yellow ink.

TABLE 1

|  | cyan comp. | Magenta comp. | yellow comp. |
|---|---|---|---|
| cyan ink | 100% | 20% | 4% |
| magenta ink | 5% | 100% | 50% |
| yellow ink | 2% | 2% | 100% |

As will be apparent from the TABLE 1, other ink components, are hardly contained in yellow ink so that the yellow ink has relatively good characteristics. However, the yellow and magenta components contained in the magenta and cyan ink, respectively, are inhomogeneous color components having considerably great concentration percentages, which is the maximum cause of degrading reproduced colors.

For these reasons, in this case, a first object of masking processing is to adjust the two inhomogenous color components. In connection with this, the present invention is intended to reduce the capacity of a memory for a masking table.

In the case of ink having the characteristics such as shown in the table 1, a masking matrix such as shown below, for example, is used:

$$\begin{pmatrix} C' \\ M' \\ Y' \end{pmatrix} = \begin{pmatrix} 1 & -0.05 & -0.02 \\ -0.20 & 1 & -0.02 \\ -0.04 & -0.50 & 1 \end{pmatrix} \begin{pmatrix} C \\ M \\ Y \end{pmatrix}$$

In the case of cyan, C'=C−0.05M−0.02 Y. Thus, in order to calculate the output concentration of cyan if 6 bits are given to the output concentration of cyan, 6 bits are not needed for each of M and Y. It is considered that the number of gradations required of magenta is sufficiently satisfied by about 5/100 of the number of gradations which cyan has. Thus, the number of gradation is $2^6 \times 5/100 = 3.2$. That is, 2 bits is considered to suffice magenta. Similarly, 1 bit will suffice yellow.

In the case of magenta, M'=−0.20 C+M−0.02 Y. Thus, when the magenta gradation bits is to be calculated in a similar way to the calculation of the cyan gradation bits, the number of gradations required of cyan is:

$2^6 \times 20/100 = 12.8 \to 4$ bits the number of gradations required of yellow is:

$2^6 \times 2/100 = 1.28 \to 1$ bit

Similarly, in the case of yellow, Y' = −0.04 C−0.05M+1.0 Y. Thus, the number of gradations required of cyan is:

$2^6 \times 4/100 = 2.56 \to 2$ bits the number of gradations required of magenta is:

$2^6 \times 50/100 = 32 \to 5$ bits

Figure 1:
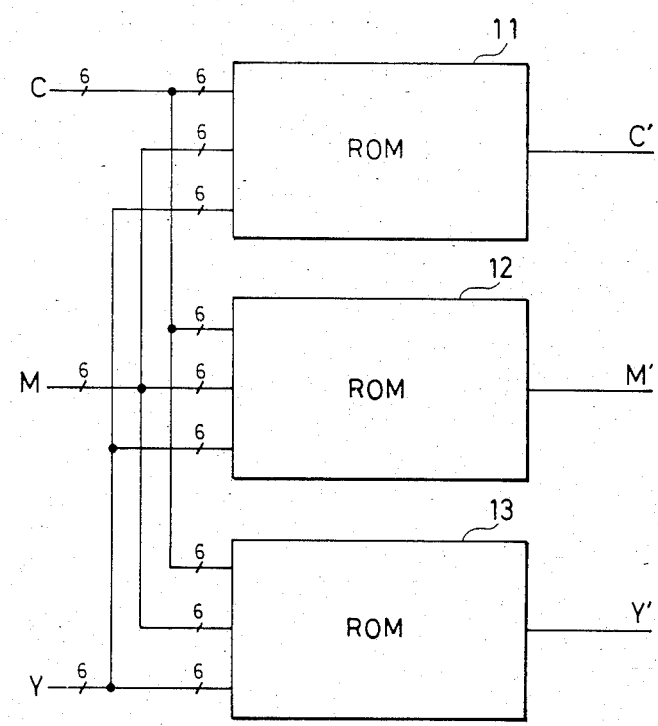
FIG. 1 illustrates a prior art masking circuit.
Figure 2:
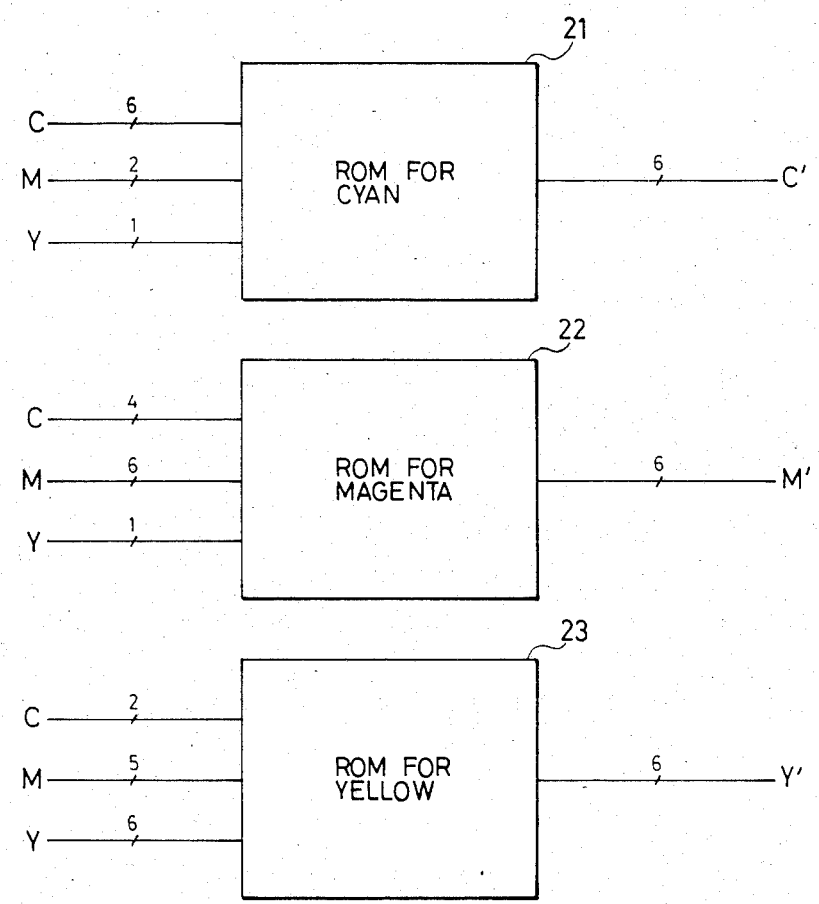
FIG. 2 illustrates a masking circuit according to the present invention.

FIG. 2 shows the structure of a masking table which carries out the present invention.

According to this structure, a ROM 21 for cyan requires $6 \times 2^9 = 3$ Kbits; a ROM 22 for magenta $6 \times 2^{11} = 12$ Kbits; and a ROM 23 for yellow $6 \times 2^{13} = 48$ Kbits. Thus, the masking ROM is composed of $3 + 12 + 48 = 63$ Kbits in all.

Figure 3:
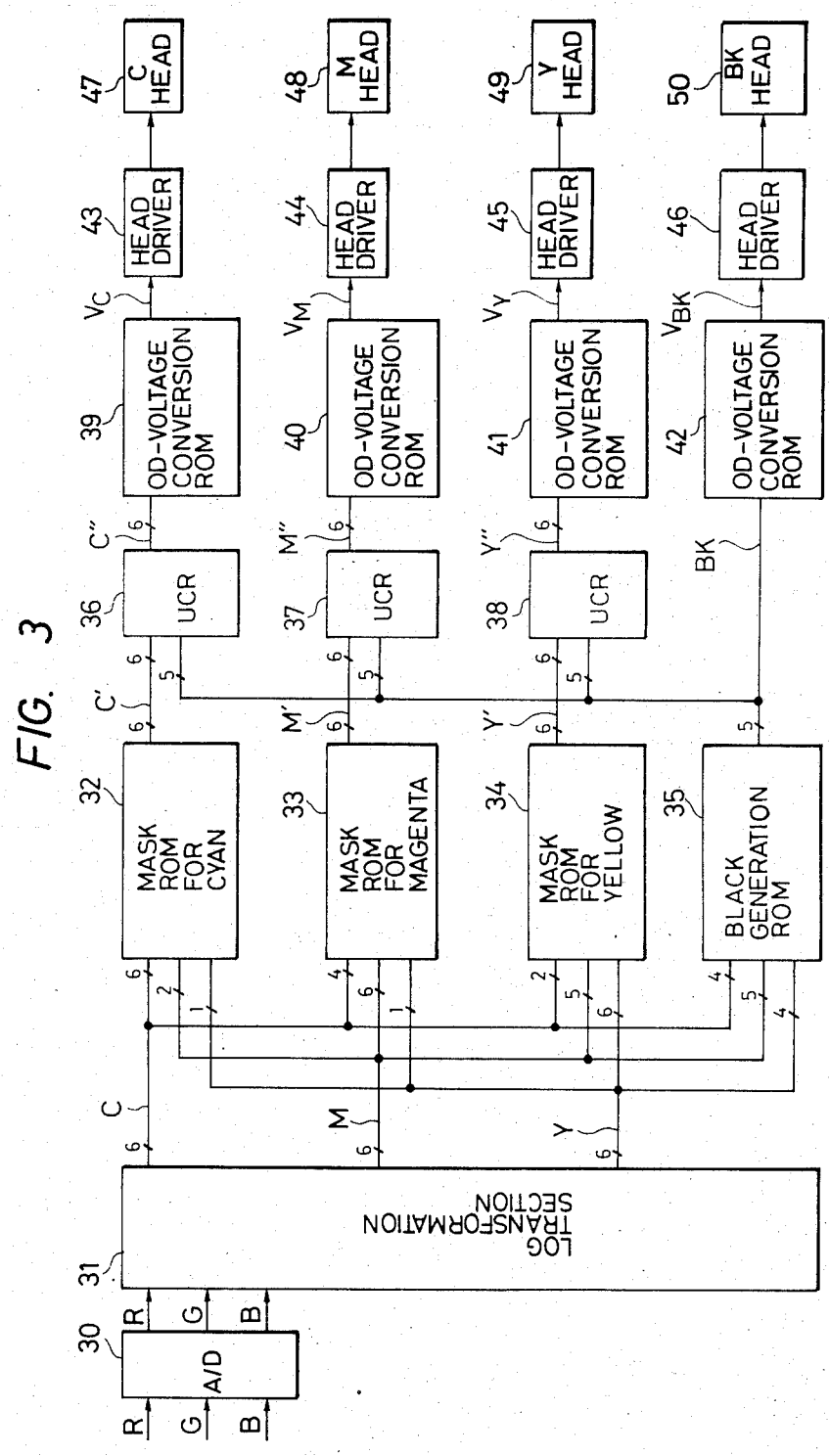
FIG. 3 illustrates a color image processing circuit which carries out the present invention.

FIG. 3 shows a block diagram of a video printer using a masking ROM which has the above structure.

Input signals R, G and B are each converted by an AD converter 30 into corresponding digital signals which are then input to a LOG transformation section 31. This section performs a logarithmic transformation of R. G. B input digital signals, thereby obtaining 6-bit digital signals C, M, Y for cyan, magenta and yellow, respectively. All the 6 bits of the cyan digital signal C, the most significant two bits of the magenta digital signal M, and the most significant bit of the yellow digital signal are input to a masking ROM for cyan 32. Similarly, all the 6 bits of the magenta signal M, the most significant 4 bits of the cyan signal C, and the most significant bit of the yellow signal Y are input to a masking ROm for magenta, 33.

All the 6 bits of the yellow signal Y, the most significant two bits of the cyan signal C, and the most significant five bits are input to a masking ROM for yellow, 34.

The most significant five bits of the magenta signal M, and the most significant four bits of each of the cyan and yellow signals C and Y are input to a black generation ROM 35 which outputs a black signal BK as the minimum value of the signals C, M and Y. The signal BK is shown as being a data of 5 bits while C', M' and Y' are a data of 6 bits.

Figure 4:
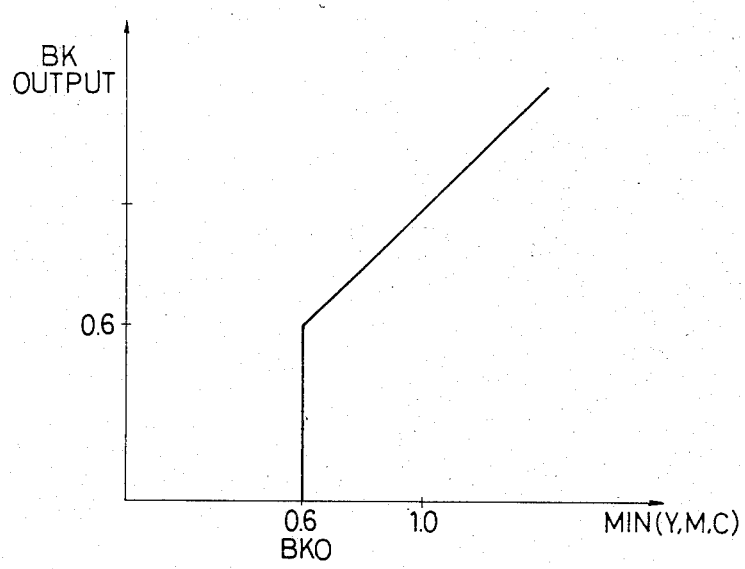
FIG. 4 illustrates the input and output characteristics of a black generation ROM.

FIG. 4 is a graph of the output data of ROM 35.

The minimum value of Y, M and C is usually handled as black. However, in the particular embodiment, when the OD value of black is equal to, or smaller than, 0.6 BK0, ink dots of black are not formed, but black which is equal to, or smaller than, 0.6 is expressed by a combination of three-color (Y, M, C) dots. Therefore, the value of BK is set as follows:

When $\min(Y, M, C) \leq BK0$,
BK = 0
When $\min(Y, M, C) > BK0$,
BK = $\min(Y, M, C)$ Since BK0 is about half of the whole degradation area, 5 bits are enough for the gradation of BK, provided that all the gradations can be expressed by 6 bits. Thus, 5 bits are given for BK while 6 bits are given for each of Y', M' and C'. This results in a reduction in the capacity of a memory of each of UCR sections 36, 37 and 38, which will be described later.

That is, the results of subtracting BK from the minimum value of C, M and Y are stored in the black generation ROM 35.

The reason why the number of input bits to ROM 35 is M bits greater than Y and C is that magenta has the greatest influence on the brightness of an image.

When the black component BK which is not 0 is obtained, the BK value is subtracted from a respective one of C', M' and Y' at the UCR sections 36, 37 and 38 which remove the respective underlying colors, thereby resulting in C'', M'' and Y'''. For example, at UCR section 36, the calculation $C'' = C' - \alpha BK$ is performed.

Finally, the respective final concentration values of the cyan, magenta and yellow colors are converted to corresponding voltage values by OD-voltage conversion ROMs 39, 40, 41 and 42. Those voltage values are via head drivers 43, 44, 45 and 46 supplied to corresponding color ink jet heads 47, 48, 49 and 50.

Any kinds of ink jet heads may be used so long as they can control an quantity of ink which adheres to the face of paper in accordance with changes in voltage, pulse width, etc. For example, the head disclosed in U.S. Pat. No. 3,683,212 specification is recommended.

Instead of each of the heads 47–50, an ink jet head may be composed of a threshold matrix which compares an input value representative of each image on picture elements and the threshold value corresponding to the address thereof, and a dither processor which is turned on and off when the input value are respectively greater and smaller than the threshold value. In this case, a recording head which can perform only an on-off(binary) expression may be used.

The present invention is applicable not only to jet printers, but also to color printers such as thermal printers, electrostatic printers, etc.

As described above, according to the present invention, the accuracy of color adjustment is maintained with a memory having a greatly reduced capacity. Thus, an inexpensive color image signal processing apparatus can be provided.

While the present invention has been shown and described in terms of the preferred embodiments thereof, it is not limited to them. Many changes and modifications could be made by those skilled in the art without departing from the scope of the present invention as set forth in the claims.

What is claimed is:

1. A method of processing a color image signal, comprising the steps of:
    obtaining three color digital signals, each representing one of cyan, magenta and yellow, and each consisting of a plurality of bits;
    selecting a number of bits of each of the three color digital signals to correct the signals in accordance with the intensities of inhomogeneous color components contained in cyan, magenta and yellow colorants represented by the respective color digital signals; and
    performing a color correction for each of the colorants in response to the signals having the number of bits selected in the selecting step.

2. A method according to claim 1, wherein each of the selected number of bits consists of the more significant bits from the plurality of bits of its respective digital color signal.

3. A method according to claim 1 wherein said performing step is carried out using a reference table including memories and the signals having selected numbers of bits are used to address the memories.

4. A method of producing a black signal, comprising the steps of:
    obtaining three digital color signals, each signal consisting of a plurality of bits;
    selecting a number of bits from each of said three digital color signal; and
    obtaining a black signal from signals represented by the selected number of bits.

5. A method according to claim 7, wherein the three digital color signals represent cyan, magenta and yellow and said selecting step includes selecting the number of bits of the magenta digital color signal to be greater than at least one of the selected number of bits of the yellow and cyan digital color signals.

6. A method according to claim 4, wherein each of the selected number of bits consists of the more significant bits from the plurality of bits of its respective digital color signal.

7. A method according to claim 4, wherein said selecting step includes selecting each number of bits of its respective signal in accordance with its influence over the brightness of the image producible by the signals.

8. A method according to claim 4, wherein said obtaining step includes obtaining the black signal by referring to a reference table including a memory and using the signals having selected numbers of bits to address the memories.

* * * * *